(12) United States Patent
Feng et al.

(10) Patent No.: US 9,887,912 B2
(45) Date of Patent: Feb. 6, 2018

(54) FLOW TABLE MATCHING METHOD AND APPARATUS, AND OPENFLOW SWITCHING SYSTEM

(71) Applicant: HUAWEI TECHNOLOGIES CO., LTD., Shenzhen (CN)

(72) Inventors: Qiang Feng, Hangzhou (CN); Weifeng Shen, Hangzhou (CN); Xiuchu Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 15/198,268

(22) Filed: Jun. 30, 2016

(65) Prior Publication Data
US 2016/0308759 A1    Oct. 20, 2016

Related U.S. Application Data

(63) Continuation of application No. PCT/CN2014/092170, filed on Nov. 25, 2014.

(30) Foreign Application Priority Data

Dec. 30, 2013   (CN) .......................... 2013 1 0749898

(51) Int. Cl.
*H04L 12/721*   (2013.01)
*H04L 12/741*   (2013.01)
*H04L 29/06*    (2006.01)

(52) U.S. Cl.
CPC ............ *H04L 45/38* (2013.01); *H04L 45/745* (2013.01); *H04L 69/22* (2013.01)

(58) Field of Classification Search
None
See application file for complete search history.

(56) References Cited

U.S. PATENT DOCUMENTS 9,602,398 B2 *  3/2017  Pettit .................. H04L 45/38
9,686,185 B2 *  6/2017  Shelly ................ H04L 45/38
(Continued)

FOREIGN PATENT DOCUMENTS

CN    103051539 A    4/2013
CN    103200101 A    7/2013
(Continued)

OTHER PUBLICATIONS

Chinese Office Action dated Jul. 19, 2017 in corresponding Chinese Patent Application No. 201310749898.8 X.
(Continued)

*Primary Examiner* — Hong Cho
(74) *Attorney, Agent, or Firm* — Staas & Halsey LLP

(57) ABSTRACT

The present disclosure discloses a flow table matching method and apparatus and an OpenFlow switching system to implement matching of any field in any data flow without changing existing hardware logic or a standard protocol. The method includes: receiving a jump instruction and a match instruction that are delivered by a controller for a first flow table; creating a first flow entry in the first flow table; receiving a flow mode message delivered by the controller for a second flow table; and creating a second flow entry in the second flow table. The present disclosure lays a foundation for implementing really flexible and programmable software-defined networking, assists a network service operator in reducing capital expenditures and operation expenditures, and enables a traditional IP network to have more flexible network abstraction and management capabilities for a real-time service.

12 Claims, 6 Drawing Sheets

(56) References Cited

U.S. PATENT DOCUMENTS

2013/0254766 A1    9/2013  Zuo et al.
2015/0372905 A1   12/2015  Hu
2016/0197831 A1*   7/2016  De Foy ............... H04L 45/7453
                                                       370/392
2016/0226768 A1*   8/2016  Liu .................... H04L 12/6418

FOREIGN PATENT DOCUMENTS

CN    103281246 A    9/2013
CN    103346922 A   10/2013
CN    103368851 A   10/2013
CN    103905303 A    7/2014

OTHER PUBLICATIONS

"OpenFlow Switch Specification," Open Networking Foundation, Version 1.4.0 (Wire Protocol0x05), Aug. 5, 2013.
International Search Report dated Mar. 2, 2015 in corresponding International Patent Application No. PCT/CN2014/092170.
"OpenFlow Switch Specification Version 1.1.0 Implemented (Wire Protocol 0x02)", Open Networking Foundation, ONF TS-002, Feb. 28, 2011, pp. 1-2, 1-56.
"OpenFlow Switch Specification Version 1.2 (Wire Protocol 0x03)", Open Networking Foundation, ONF TS-002, Dec. 5, 2011, pp. 1-2, 1-82.
International Search Report dated Mar. 2, 2015, in corresponding International Application No. PCT/CN2014/092170.

* cited by examiner

FLOW TABLE MATCHING METHOD AND APPARATUS, AND OPENFLOW SWITCHING SYSTEM

CROSS-REFERENCE TO RELATED APPLICATIONS

This application is a continuation of International Application No. PCT/CN2014/092170, filed on Nov. 25, 2014, which claims priority to Chinese Patent Application No. 201310749898.8, filed on Dec. 30, 2013, both of which are hereby incorporated by reference in their entireties.

TECHNICAL FIELD

The present disclosure relates to the field of data switching, and specifically, to a flow table matching method and apparatus, and an OpenFlow switching system.

BACKGROUND

In an OpenFlow technology, programming a network is allowed as if the network were a computer. In OpenFlow and software-defined networking (SDN), an abstraction layer of a physical network may be directly provided for a control component, and setting and operating a network by using software is allowed. A core idea of the OpenFlow technology is to convert a packet forwarding process, which is originally under full control of a switch/router, into an independent process that is completed by an OpenFlow switch and a controller separately.

The OpenFlow switch includes three parts: a flow table, a secure channel, and an OpenFlow protocol. The flow table includes a match field (Match Field), a counter (Counter), and an instruction set (Instructions), and is used to store a forwarding rule for a packet. The secure channel is an interface for connecting the OpenFlow switch to the controller. The OpenFlow protocol is a standard for describing information used for interaction between the controller and the switch. In an OpenFlow network, the OpenFlow switch executes a command from the OpenFlow controller, and forwards a received packet according to a flow rule delivered by the controller. When unable to find a forwarding rule corresponding to a received packet, the OpenFlow switch forwards the packet to the controller, and the controller decides a forwarding action of the packet, and delivers a new forwarding rule to the OpenFlow switch.

Packet matching performed by the existing OpenFlow switch can be based only on limited fields. That is, the match field of the flow table in the switch cannot be updated dynamically. For example, it is assumed that the match field of the flow table has only three fields available for matching packets, where the three fields are field A, field B, and field C that are specified in the protocol. In a packet, when a characteristic field used to represent a data flow corresponding to the packet is field D, instead of any one of the field A, the field B, and the field C, if the OpenFlow switch performs packet matching, the match field of the flow table needs to be extended to the field A, the field B, the field C, and the field D. The extending generally needs to bear a cost, for example, changing hardware logic or upgrading current software and/or hardware.

It can be seen that the existing match field of the Switch cannot be updated dynamically, the update of the match field can be supported only when the current software/hardware is upgraded, and service requirements cannot be met.

SUMMARY

Embodiments of the present disclosure provide a flow table matching method and apparatus and an OpenFlow switching system to implement matching of any field in any data flow without changing existing hardware logic or a standard protocol.

According to a first aspect, a flow table matching method includes: receiving a jump instruction and a match instruction that are delivered by a controller for a first flow table, where the match instruction is used to map a match field onto a mapping value, write the mapping value into a metadata field, and transfer the mapping value to a second flow table, the match instruction includes a parameter used to map the match field onto the mapping value, and the jump instruction is used to jump to the second flow table;

creating a first flow entry in the first flow table, where an instruction set of the first flow entry is the jump instruction and the match instruction, the match instruction is used to, after a switch receives a packet, map the match field onto a mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field;

receiving a flow mode message delivered by the controller for the second flow table, where the flow mode message includes an action instruction and a metadata value that is used to match the match field; and creating a second flow entry in the second flow table, where an instruction set of the second flow entry is the action instruction, a match field of the second flow entry is the metadata value, the match field of the second flow entry is used to match the mapping value Mp, and the action instruction is used to process the packet according to a matching result.

According to a second aspect, a flow table matching method is provided, and the method includes: receiving a first jump instruction and a first match instruction that are delivered by a controller for a first flow table, where the first match instruction is used to map a first match field onto a first mapping value, write the first mapping value into a metadata field, and transfer the first mapping value to a second flow table, the first match instruction includes a parameter used to map the first match field onto the first mapping value, the first jump instruction is used to jump to the second flow table, a field that needs to match includes Nb bytes, Nb=n*Nm, n is an integer greater than 1, Nm is equal to a maximum quantity of bytes that can be included in the metadata field of the flow table, and the first match field is a $1^{st}$ byte to an $Nm^{th}$ byte in the field that needs to match;

creating a first flow entry in the first flow table, where an instruction set of the first flow entry is the first jump instruction and the first match instruction, the first match instruction is used to, after a switch receives a packet, map the first match field onto the first mapping value Mp1 according to the parameter that is included in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table;

receiving n−1 flow mode messages delivered by the controller for n−1 flow tables, where an $i^{th}$ flow mode message is delivered for an $i^{th}$ flow table, n≥i≥2, the $i^{th}$ flow mode message includes an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction includes the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, and a next flow table of an $n^{th}$ flow table is a last flow table;

creating n−1 flow entries in the n−1 flow tables, where an $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is included in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table;

receiving a last flow mode message delivered by the controller for the last flow table, where the last flow mode message includes an action instruction and an $n^{th}$ metadata value that is used to match an $n^{th}$ match field; and creating a last flow entry in the last flow table, where an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

According to a third aspect, a flow table matching apparatus is provided, and the apparatus includes: a first receiving module, configured to receive a jump instruction and a match instruction that are delivered by a controller for a first flow table, where the match instruction is used to map a match field onto a mapping value, write the mapping value into a metadata field, and transfer the mapping value to a second flow table, the match instruction includes a parameter used to map the match field onto the mapping value, and the jump instruction is used to jump to the second flow table;

a first creating module, configured to create a first flow entry in the first flow table, where an instruction set of the first flow entry is the jump instruction and the match instruction, the match instruction is used to, after a switch receives a packet, map the match field onto a mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field;

a second receiving module, configured to receive a flow mode message delivered by the controller for the second flow table, where the flow mode message includes an action instruction and a metadata value that is used to match the match field; and a second creating module, configured to create a second flow entry in the second flow table, where an instruction set of the second flow entry is the action instruction, a match field of the second flow entry is the metadata value, the match field of the second flow entry is used to match the mapping value Mp, and the action instruction is used to process the packet according to a matching result.

According to a fourth aspect, a flow table matching apparatus is provided, and the apparatus includes: a third receiving module, configured to receive a first jump instruction and a first match instruction that are delivered by a controller for a first flow table, where the first match instruction is used to map a first match field onto a first mapping value, write the first mapping value into a metadata field, and transfer the first mapping value to a second flow table, the first match instruction includes a parameter used to map the first match field onto the first mapping value, the first jump instruction is used to jump to the second flow table, a field that needs to match includes Nb bytes, Nb=n*Nm, n is an integer greater than 1, Nm is equal to a maximum quantity of bytes that can be included in the metadata field of the flow table, and the first match field is a $1^{st}$ byte to an $Nm^{th}$ byte in the field that needs to match;

a third creating module, configured to create a first flow entry in the first flow table, where an instruction set of the first flow entry is the first jump instruction and the first match instruction, the first match instruction is used to, after a switch receives a packet, map the first match field onto the first mapping value Mp1 according to the parameter that is included in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table;

a fourth receiving module, configured to receive n−1 flow mode messages delivered by the controller for n−1 flow tables, where an $i^{th}$ flow mode message is delivered for an $i^{th}$ flow table, n≥i≥2, the $i^{th}$ flow mode message includes an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction includes the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, and a next flow table of an $n^{th}$ flow table is a last flow table;

a fourth creating module, configured to create n−1 flow entries in the n−1 flow tables, where the $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is included in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table;

a fifth receiving module, configured to receive a last flow mode message delivered by the controller for the last flow table, where the last flow mode message includes an action instruction and an $n^{th}$ metadata value that is used to match an $n^{th}$ match field; and a fifth creating module, configured to create a last flow entry in the last flow table, where an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

According to a fifth aspect, an OpenFlow switching system is provided, where the switching system includes a switch and a controller, the switch includes a first receiving module, a first creating module, a second receiving module, and a second creating module;

the controller is configured to deliver a jump instruction and a match instruction that are for a first flow table to the switch, and deliver a flow mode message for a second flow table to the switch, where the match instruction is used to map a match field onto a mapping value, write the mapping value into a metadata field, and transfer the mapping value to the second flow table, the match instruction includes a parameter used to map the match field onto the mapping value, and the jump instruction is used to jump to the second flow table, and the flow mode message includes an action instruction and a metadata value that is used to match the match field;

the first receiving module is configured to receive the jump instruction and the match instruction that are delivered by the controller for the first flow table;

the first creating module is configured to create a first flow entry in the first flow table, where an instruction set of the first flow entry is the jump instruction and the match instruction, the match instruction is used to, after the switch receives a packet, map the match field onto the mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field;

the second receiving module is configured to receive the flow mode message delivered by the controller for the second flow table; and the second creating module is configured to create a second flow entry in the second flow table, where an instruction set of the second flow entry is the action instruction, a match field of the second flow entry is the metadata value, the match field of the second flow entry is used to match the mapping value Mp, and the action instruction is used to process the packet according to a matching result.

According to a sixth aspect, an OpenFlow switching system is provided, where the switching system includes a switch and a controller, the switch includes a third receiving module, a third creating module, a fourth receiving module, a fourth creating module, a fifth receiving module, and a fifth creating module;

the controller is configured to: deliver a first jump instruction and a first match instruction that are for a first flow table to the switch, deliver n−1 flow mode messages for n−1 flow tables to the switch, and deliver a last flow mode message for a last flow table to the switch, where the first match instruction is used to map a first match field onto a first mapping value, write the first mapping value into a metadata field, and transfer the first mapping value to a second flow table, the first match instruction includes a parameter used to map the first match field onto the first mapping value, the first jump instruction is used to jump to the second flow table, a field that needs to match includes Nb bytes, Nb=n*Nm, n is an integer greater than 1, Nm is equal to a maximum quantity of bytes that can be included in the metadata field of a flow table, the first match field is a $1^{st}$ byte to an $Nm^{th}$ byte in the field that needs to match, an $i^{th}$ flow mode message is delivered for an $i^{th}$ flow table, n≥i≥2, the $i^{th}$ flow mode message includes an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction includes the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, a next flow table of an $n^{th}$ flow table is the last flow table, and the last flow mode message includes an action instruction and an $n^{th}$ metadata value that is used to match an $n^{th}$ match field;

the third receiving module is configured to receive the first jump instruction and the first match instruction that are delivered by the controller for the first flow table;

the third creating module is configured to create a first flow entry in the first flow table, where an instruction set of the first flow entry is the first jump instruction and the first match instruction, the first match instruction is used to, after the switch receives a packet, map the first match field onto the first mapping value Mp1 according to the parameter that is included in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table;

the fourth receiving module is configured to receive the n−1 flow mode messages delivered by the controller for the n−1 flow tables;

the fourth creating module is configured to create n−1 flow entries in the n−1 flow tables, where an $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is included in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table;

the fifth receiving module is configured to receive the last flow mode message delivered by the controller for the last flow table; and the fifth creating module is configured to create a last flow entry in the last flow table, where an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

From the embodiments of the present disclosure, it can be learned that a parameter included in a match instruction is a parameter used to map a match field onto a mapping value, where the match field may be any field except a matchable field specified in a standard protocol. By mapping the match field onto the mapping value, a metadata value delivered by a controller can be matched with the mapping value. Therefore, in comparison with an existing POF technology in which an instruction set specified by an OpenFlow protocol is changed completely and implementation involves a huge workload, the method provided in the embodiments of the present disclosure provides a manner supported by a dynamically extended protocol and enhances manageability of a data flow without changing existing hardware logic or an OpenFlow standard protocol. When a new application/protocol appears and needs to be processed, smooth support can be implemented in a software-only manner without the need of hardware upgrade. Because a matching range of a flow table match field is extended in a software-only manner without changing existing hardware logic, a foundation is also laid for implementing truly flexible and programmable software-defined networking, a network service operator can be assisted in reducing capital expenditures and operational expenditures, and a traditional IP network has more flexible network abstraction and management capabilities for a real-time service.

DESCRIPTION OF EMBODIMENTS

Figure 1:
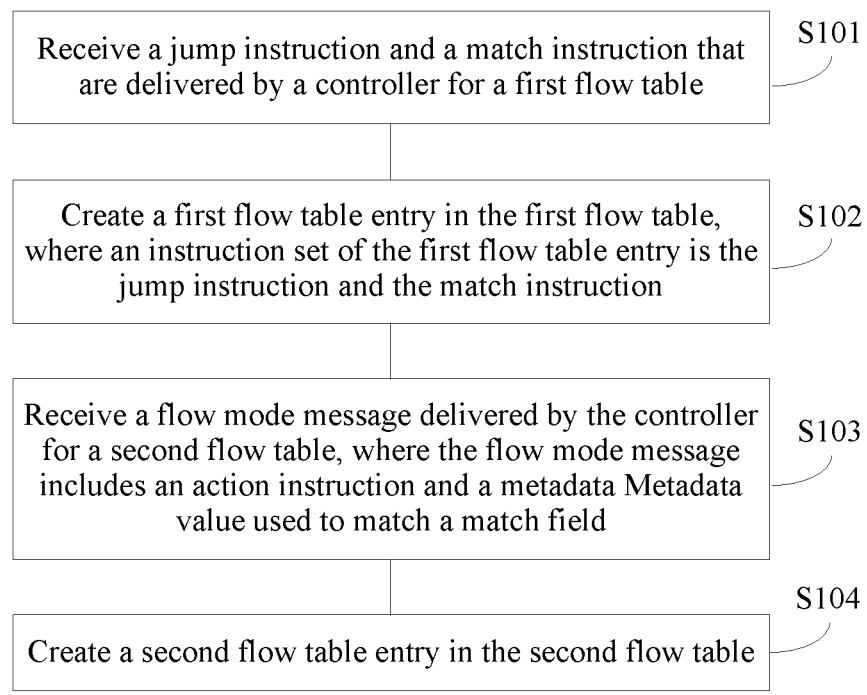
FIG. 1 is a basic schematic flowchart of a flow table matching method according to an embodiment of the present disclosure.

Embodiments of the present disclosure provide a flow table matching method, including: receiving a jump instruction and a match instruction that are delivered by a controller for a first flow table, where the match instruction is used to map a match field onto a mapping value, write the mapping value into a metadata field, and transfer the mapping value to a second flow table, the match instruction includes a parameter used to map the match field onto the mapping value, and the jump instruction is used to jump to the second flow table; creating a first flow entry in the first flow table, where an instruction set of the first flow entry is the jump instruction and the match instruction, the match instruction is used to, after a switch receives a packet, map the match field onto a mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field; receiving a flow mode message delivered by the controller for the second flow table, where the flow mode message includes an action instruction and a metadata value that is used to match the match field; and creating a second flow entry in the second flow table, where an instruction set of the second flow entry is the action instruction, a match field of the second flow entry is the metadata value, the match field of the second flow entry is used to match the mapping value Mp, and the action instruction is used to process the packet according to a matching result. The embodiments of the present disclosure further provide a corresponding flow table matching apparatus and an OpenFlow switching system, which are separately described below in detail.

The flow table matching method according to an embodiment of the present disclosure is applicable to an OpenFlow switch and an OpenFlow switching system that includes the OpenFlow switch and an OpenFlow controller. The method may be performed by the OpenFlow switch. For a basic process, reference may be made to FIG. 1. The method primarily includes step S101 to step S104.

S101. Receive a jump instruction and a match instruction that are delivered by a controller for a first flow table.

The match instruction delivered by the controller for the first flow table is used to map a match field onto a mapping value, write the mapping value, which is obtained by means of the mapping, into a metadata field, and transfer the mapping value to a second flow table. The match instruction includes a parameter used to map the match field onto the mapping value, and the jump instruction is used to jump to the second flow table.

In all the embodiments of the present disclosure, the flow table refers to a flow table maintained in an OpenFlow switch, and the flow table is similar to a flow table defined in an OpenFlow standard protocol. For example, both include a match field (Match Field), a counter (Counter), and an instruction set (Instructions). The flow table is an integral part of the switch. The switch refers to an OpenFlow switch, and the controller refers to an OpenFlow controller. In the embodiment of the present disclosure, the match field may be a matchable field specified by a standard protocol in a to-be-matched data flow, or may be any field except a matchable field specified by a standard protocol in a to-be-matched data flow. For example, the OpenFlow standard protocol may specify only limited fields such as an IP address, a port number, and a MAC address. However, some data flows are still not matchable or identifiable by using only the matchable field specified by the standard protocol, and may need to be identified by using a characteristic value used to identify the data flow. In the embodiment of the present disclosure, a metadata value corresponding to the match field (for example, a characteristic value that uniquely identifies the data flow) in various data flows may be calculated in advance, and the OpenFlow controller maintains the metadata value at a local end. That is, the OpenFlow controller maintains a metadata value that uniquely corresponds to each type of data flow.

S102. Create a first flow entry in the first flow table, where an instruction set of the first flow entry is the jump instruction and the match instruction.

As described above, the match instruction includes the parameter used to map the match field onto the mapping value, and the parameter includes: a mask, a start position of the match field in a packet to which the match field belongs, a quantity of offset bytes of the match field in the packet to which the match field belongs, and a flow identifier of a data flow that includes the packet to which the match field belongs. The match instruction is used to, after the switch receives a packet, map the match field onto a mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field.

After receiving the jump instruction and the match instruction that are delivered by the controller for the first flow table, the switch may create a first flow entry in the first flow table. In the embodiment of the present disclosure, the match instruction delivered by the controller may be a structure (struct). Assuming that a name of the structure is ofp_instruction_proto_ext, in an embodiment of the present disclosure, the match instruction may be shown as follows:

```
struct ofp_instruction_proto_ext
{
int16_t   type;
int16_t   len;
int8_t    pad[4];
uint8_t   serial_no;
uint8_t   match_ext_num;
struct match_ext   match_ext_value [OFP_MAX_PROTO_EXT_LEN];
};
```

In the structure ofp_instruction_proto_ext, match_ext_value is a structure whose quantity is a constant value OFP_MAX_PROTO_EXT_LEN (for example, OFP_MAX_PROTO_EXT_LEN is equal to 7), and each structure represents a match field of one byte. A specific quantity of extension match fields that can be supported is defined by a length of an abstract Metadata value supported by the switch. The structure match_ext_value is defined below:

```
struct   match_ext_value
{
enum start_position   position;
uint16_t   offset;
uint8_t    bitmask;
uint8_t    Reserved;
};
```

In the match instruction represented by the structure ofp_instruction_proto_ext, parameters that are used to map the match field onto the mapping value Mp and that are mentioned in the foregoing embodiment include bitmask, position, offset, and serial_no, where:

bitmask represents a mask, and is used to decide which bits of the match field are valid;

position represents a start position of the match field in a packet to which the match field belongs, a data structure type is an enumerated type, the structure is a quantity of start bytes of a field in a common TCP/IP packet whose location is determined, this field is combined with an offset to determine a specific location of the match field in the packet to which the match field belongs, and the structure of the position is shown below:

```
struct start_position
{
LINK_DATA_START = 0;
MAC_DST = 0;
MAC_SRC = 6;
MAC_DATA_START = 14;
IP_SRC = 26;
IP_DST = 30;
IP_DATA_START = 34;
UDP_DATA_START = 42;
};
``` offset represents a quantity of offset bytes of the match field in the packet to which the match field belongs;

serial_no represents a serial number of a data flow, namely, a flow identifier of a data flow that includes the packet to which the match field belongs, where the controller allocates different serial numbers according to the type of the data flow to represent different data flows, so as to manage the data flows, and the serial_no has a length of uint8, namely, can represent 256 different flow types; and match_ext_num represents a quantity of structures match_ext_value that are actually used as fillers.

In an embodiment of the present disclosure, the mapping, after the switch receives a packet, the match field onto a mapping value Mp according to the parameter that is included in the match instruction and that is used to map the match field onto the mapping value includes the following step S1021 to step S1023:

S1021. Locate the match field in the received packet according to a start position and a quantity of offset bytes, and extract the match field.

For example, if the start position position of a match field in a packet to which the match field belongs is a $2^{nd}$ byte and the quantity offset of offset bytes of the match field in the packet to which the match field belongs is 3, content of the $2^{nd}$ to the $4^{th}$ bytes of the packet is extracted as the match field.

S1022. Perform a logical AND operation on the match field extracted in step S1021 and a mask.

S1023. Fill an initial byte of a continuous byte array with a flow identifier, copy an operation result of the logical AND operation to remaining bytes of the continuous byte array successively, and use content of the continuous byte array for which the filling and copying are completed, as the mapping value Mp, where the continuous byte array is data of N bytes, and N is a maximum quantity of bytes that can be included in the metadata field of the flow table.

Because the quantity of bytes included in the metadata field is 8 in a current OpenFlow standard protocol, the continuous byte array in the embodiment of the present disclosure may be a byte array that includes 8 continuous bytes. The filling an initial byte of a continuous byte array with the flow identifier serial_no of the data flow that includes the packet to which the match field belongs, and the copying an operation result of the logical AND operation in step S1022 to remaining bytes of the continuous byte array successively, may be: filling an initial byte, namely, byte1, of 8 bytes with the flow identifier serial_no of the data flow that includes the packet to which the match field belongs, and copying the operation result of the logical AND operation in step S1022 to remaining bytes, namely, byte2, byte3, byte4, byte5, byte6, byte7, and byte8, of the 8 bytes successively, and using content of the 8 bytes, which have been filled and have completed the copying, as the mapping value Mp.

Figure 3:
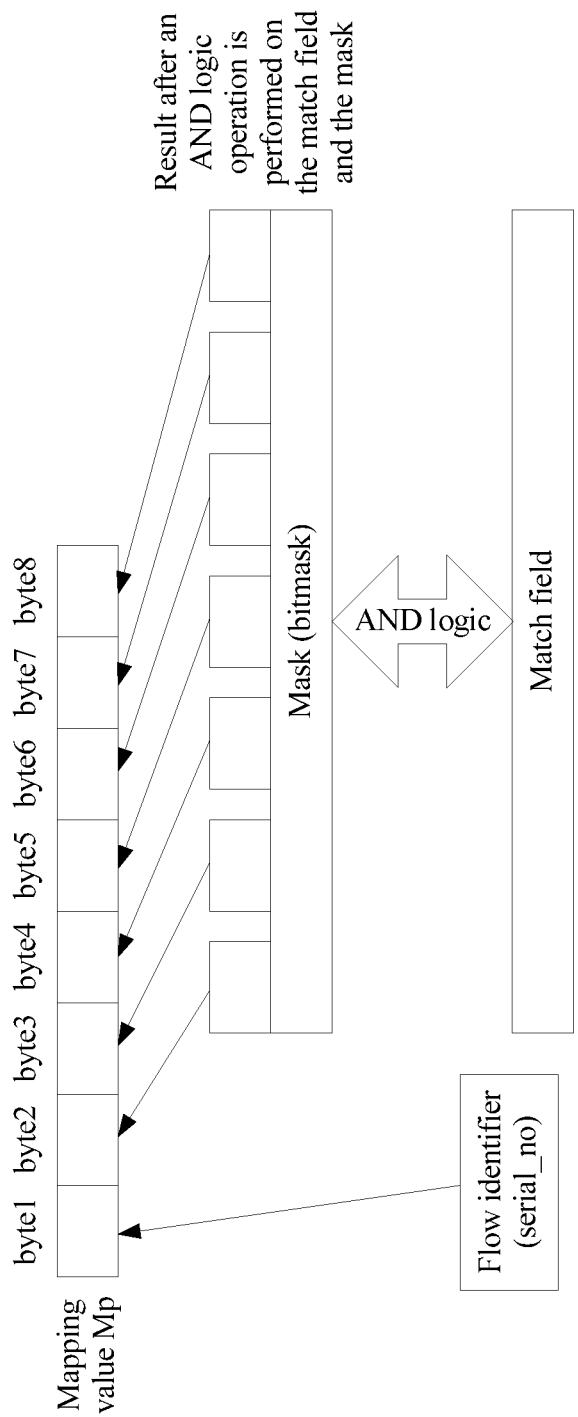
FIG. 3 is a schematic diagram of mapping a match field onto a mapping value Mp according to an embodiment of the present disclosure.

In an embodiment in which the continuous byte array may be a byte array that includes 8 continuous bytes, a process of step S1021 to step S1023 is shown in FIG. 3, where a unidirectional arrow represents copying of the operation result.

The mapping value Mp obtained in step S1023 may be written into the metadata field, and transferred together with the received packet to the second flow table.

S103. Receive a flow mode message delivered by the controller for the second flow table, where the flow mode message includes an action instruction and a metadata value that is used to match the match field.

Because the controller maintains a Metadata value that uniquely corresponds to each type of data flow, the flow mode message delivered by the controller to the second flow table indicated by the jump instruction may include an action instruction and a metadata value that is used to match the match field. In the two flow tables Table N−1 and Table N that are exemplified in FIG. 2, assuming that Table N−1 represents the first flow table in the foregoing embodiment and Table N represents the second flow table in the foregoing embodiment, the instruction set (Instructions) in Table N−1 includes the jump instruction and the match instruction that are delivered by the controller to Table N−1. Assuming that the jump instruction here is represented by Goto-Table and the match instruction here is represented by Proto-Ext, the serial number N of the second flow table may be actually assigned to a value of Goto-Table, that is, Goto-Table=N represents a jump to Table N after Table N−1 is processed. Proto-Ext is a match instruction that is newly added to an existing OpenFlow standard protocol instruction set. In the next flow table Table N indicated by the jump instruction Goto-Table, the match field (Match Fields) of the next flow table includes the metadata value delivered by the controller and used to match the match field.

S104. Create a second flow entry in the second flow table.

An instruction set of the second flow entry created by the switch in the second flow table after the switch receives the flow mode message delivered by the controller for the second flow table is the action instruction included in the flow mode message delivered by the controller for the second flow table, content in a match field of the second flow entry is the metadata value and is used to match the mapping value Mp, and the action instruction is used to process the packet according to a matching result.

Figure 2:
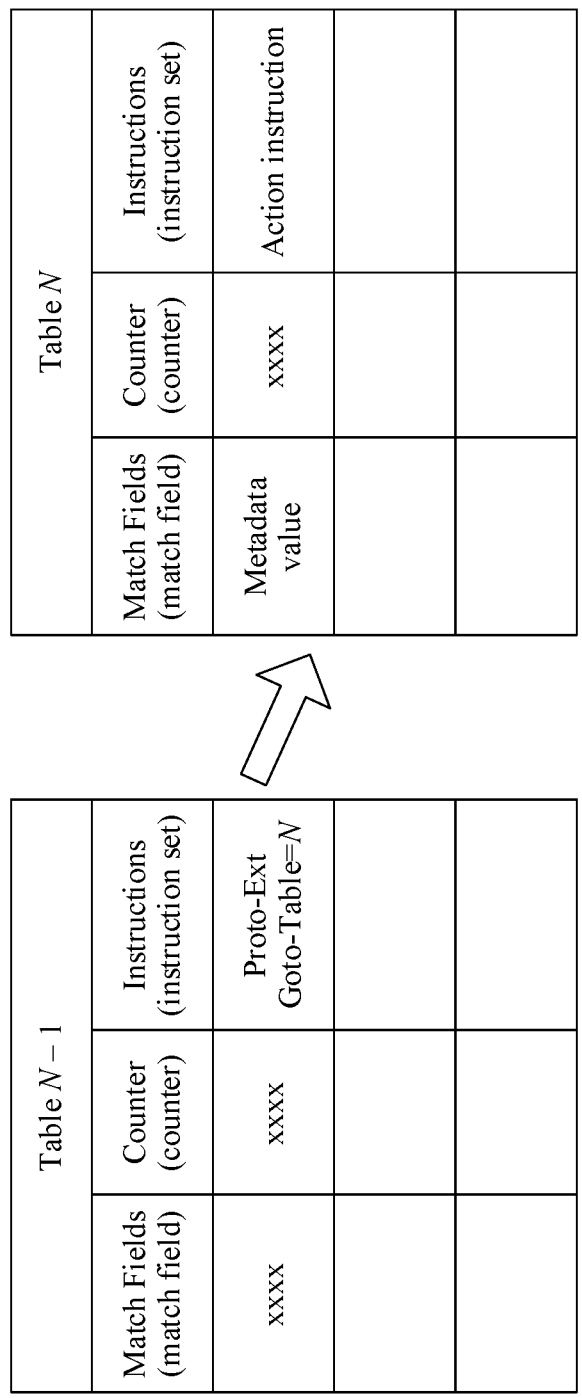
FIG. 2 is a schematic diagram in which a controller delivers to a first flow table Table N−1 a parameter used to map a match field onto a mapping value, and delivers, to a next flow table Table N of the first flow table Table N−1, namely, a second flow table, an action instruction and a metadata value that is used to match the match field according to an embodiment of the present disclosure.

As described above, the match instruction delivered by the controller to the first flow table includes a parameter used to map the match field onto the mapping value, the obtained mapping value Mp is transferred to the second flow table, and the action instruction and the metadata value that is used to match the match field, which are included in the flow mode message, are delivered to the second flow table indicated by the jump instruction. For example, as shown in FIG. 2, the controller delivers, to the flow table Table N−1, the parameter used to map the match field onto the mapping value, and delivers, to the flow table Table N, the action instruction and the metadata value that is used to match the match field. The matching between the metadata value received in step S103 and the mapping value Mp transferred to the second flow table is performed when the flow table Table N is accessed instead of being performed when the flow table Table N−1 is accessed.

If the metadata value received in step S103 and the mapping value Mp transferred to the second flow table are matched, operations are performed on the received packet according to the action instruction delivered to the second flow table. For example, the packet is dropped (drop), modified (modify), forwarded to a port (forward to port), or forwarded to the controller (forward to controller).

From the flow table matching method provided in the foregoing embodiment of the present disclosure, it can be learned that a parameter included in a match instruction is a parameter used to map a match field onto a mapping value, where the match field may be any field except a matchable field specified in a standard protocol. By mapping the match field onto the mapping value, a metadata value delivered by a controller can be matched with the mapping value. Therefore, in comparison with an existing POF technology in which an instruction set specified by an OpenFlow protocol is changed completely and implementation involves a huge workload, the method provided in the embodiment of the present disclosure provides a manner supported by a dynamically extended protocol and enhances manageability of a data flow without changing existing hardware logic or an OpenFlow standard protocol. When a new application/protocol appears and needs to be processed, smooth support can be implemented in a software-only manner without the need of hardware upgrade. Because a matching range of a flow table match field is extended in a software-only manner without changing existing hardware logic, a foundation is also laid for implementing truly flexible and programmable software-defined networking, a network service operator can be assisted in reducing capital expenditures and operational expenditures, and a traditional IP network has more flexible network abstraction and management capabilities for a real-time service.

The following gives further description about the flow table matching method according to the foregoing embodiment of the present disclosure by using an application scenario of forbidding instant communication software QQ as an example.

Using a conventional ACL to filter a flow of the QQ type or filtering an IP address of a QQ login server is much limited functionally. That is because after the QQ flow is filtered by the conventional ACL, QQ may use TCP-based ports 80 and 443 to communicate. Therefore, the communication based on a proprietary protocol of a well-known port cannot be forbidden. The filtering of the IP address of the QQ login server is not an effective means either because a quantity of servers is large and IP of every added server needs to be acquired in a timely manner and added into the ACL. Therefore, to forbid QQ thoroughly, it is necessary to:

1. identify a protocol type of a QQ application protocol data flow according to a characteristic of the QQ application protocol data flow, namely, find a feature code of the application protocol; and 2. use a more flexible packet filtering tool to match the QQ packet and perform a filtering operation.

The feature code of the QQ application protocol may be found by using a packet capturing tool. First, a QQ packet of a UDP application protocol is analyzed. A packet capturing tool Wireshark may be started, and then QQ is run and logged in to. Soon the Wireshark captures packets whose protocols are UDP and OICQ. An IP protocol header is located first, and it is learned that a length of the IP protocol header is 20 bytes, and a length of a subsequent UDP header is 8 bytes, including port numbers 4000 and 8000, which are followed by a data field of QQ information. One start byte is 0x02, which is a protocol identifier (flag) of the OICQ packet, and subsequent 2 bytes are 0x262f, which identify a version number of the QQ and represent that a current QQ version is 2011 official version. Two bytes after 0x262f are a command field, which is used as a command for QQ login and has a value of 0xba. Therefore, the protocol identifier 0x02 with an offset of 28 and the command value 0xba with an offset of 31 may be used as a feature code applied when the QQ application protocol is UDP.

Second, the TCP packet is analyzed. No matter whether an HTTP or SSL protocol is used, a QQ message has a protocol identifier field+a version field: 0x02262f, and a message field used for login is 0x0059 that is adjacent ahead. Therefore, the offset 40 and the 0x005902 are used as a feature code applied when the QQ application protocol is TCP.

Using an example in which the QQ application protocol is UDP (the analysis method is similar when the QQ application protocol is TCP), after the feature code applied when the QQ application protocol is UDP is extracted, for a QQ packet of a UDP type, the instruction that is included in the flow mode message and that is represented by the structure match_ext_value is as follows:

```
struct   match_ext_value[0]
{
enum start_position   position = IP_DATA_START;
uint16_t   offset = 28;
uint8_t    bitmask = 0xff;
uint8_t    Reserved;
};
struct   match_ext_value[1]
{
enum start_position   position = IP_DATA_START;
uint16_t   offset = 31;
uint8_t    bitmask = 0xff;
uint8_t    Reserved;
};
```

The flow identifier and the data flow serial number serial_no of the QQ application is 0x11. According to the bitmask and the offset in the structure match_ext_value[0] or match_ext_value[1], and by using a calculation method in step S1021 to step S1023 exemplified in FIG. 1, a mapping value corresponding to the feature code applied when the QQ application protocol is UDP is obtained, and is 0x1102ba0000000000, which can match an abstract Metadata value 0x1102ba0000000000 of the match field stored in the next flow table of the current flow table, and therefore, an instruction in the instruction set (Actions) is executed, namely, the QQ packet is dropped.

Figure 4:
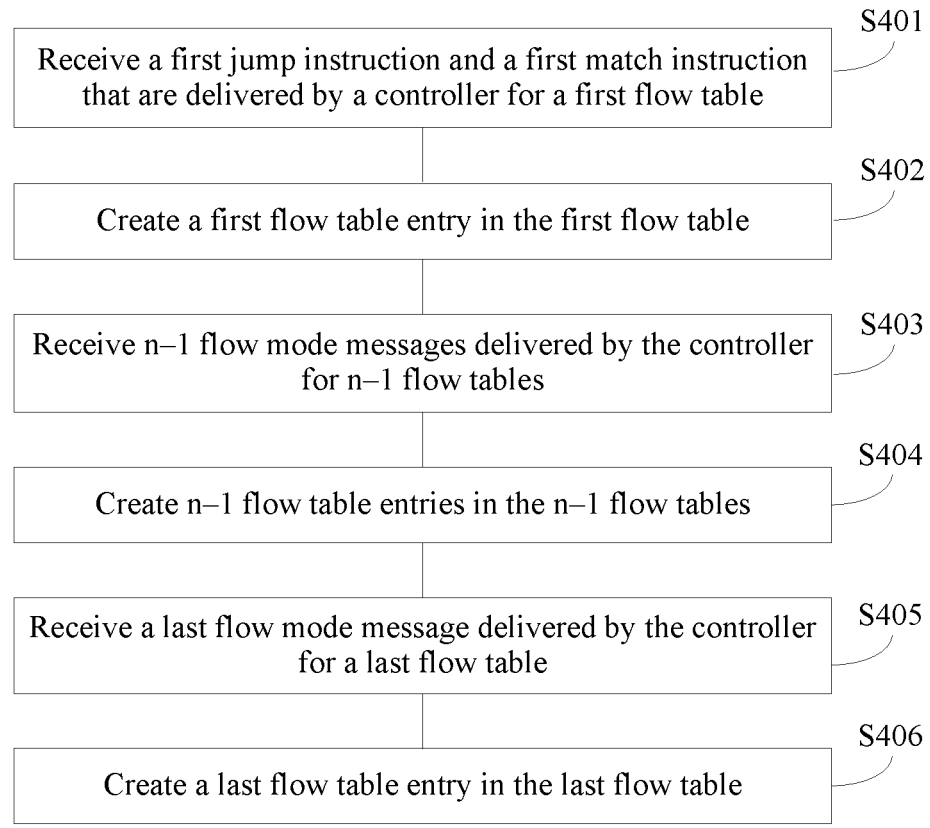
FIG. 4 is a basic schematic flowchart of a flow table matching method according to another embodiment of the present disclosure.

The flow table matching method described in the foregoing embodiment corresponds to a single level of flow table, and one flow table supports protocol extension of a maximum of 8 bytes. Actually, an embodiment of the present disclosure further provides a flow table matching method applied when multiple flow tables are concatenated. An application scenario of concatenating multiple flow tables to expand a match range of a flow table match field is as follows: A match field of a to-be-matched data flow includes too many bytes, such as more than 7 bytes, and after the match field is mapped onto a mapping value, a quantity of bytes included in the mapping value is greater than a quantity of bytes included in a metadata value in a current OpenFlow standard protocol. Therefore, matching cannot be completed by relying on the metadata value in only one flow table. To solve such a problem, another embodiment of the present disclosure provides another flow table matching method. The method is still performed by a switch in an OpenFlow switching system. For a main process, reference may be made to FIG. 4. The method includes step S401 to step S406, as described below in detail:

S401. Receive a first jump instruction and a first match instruction that are delivered by a controller for a first flow table.

The receiving, by a switch, the first jump instruction and the first match instruction that are delivered by the controller for the first flow table in this embodiment, is similar to the receiving, by the switch, the jump instruction and the match instruction that are delivered by the controller for the first flow table in step S101 exemplified in FIG. 1. That is, the first match instruction is used to instruct the switch to map a first match field onto a first mapping value, write the first mapping value into a metadata field, and transfer the first mapping value to a second flow table, the first match instruction includes a parameter used to map the first match field onto the first mapping value, the first jump instruction is used to jump to the second flow table, a field that needs to match includes $N_b$ bytes, $N_b$=n*Nm, n is an integer greater than 1, Nm is equal to a maximum quantity of bytes that can be included in the metadata field of the flow table, and the first match field is a $1^{st}$ byte to an $Nm^{th}$ byte in the field that needs to match.

S402. Create a first flow entry in the first flow table.

The creating, by the switch, the first flow entry in the first flow table after receiving the first jump instruction and the first match instruction that are delivered by the controller for the first flow table in this embodiment, is similar to the creating the first flow entry in the first flow table in step S102 exemplified in FIG. 1. That is, an instruction set of the first flow entry is the first jump instruction and the first match instruction, the first match instruction is used to, after the switch receives a packet, map the first match field onto the first mapping value Mp1 according to the parameter that is included in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table.

The parameter used to map the first match field onto the first mapping value includes: a first mask, a first start position of the first match field in a packet to which the first match field belongs, a first quantity of offset bytes of the first match field in the packet to which the first match field belongs, and a first flow identifier of a data flow that includes the packet to which the first match field belongs, and the mapping the first match field onto a first mapping value Mp1 according to the parameter that is included in the first match instruction and that is used to map the first match field onto the first mapping value includes the following step S4021 to step S4023:

S4021. Locate the first match field in the received packet according to the first start position and the first quantity of offset bytes, and extract the first match field.

S4022. Perform a logical AND operation on the first match field extracted in step S4021 and the first mask.

S4023. Fill an initial byte of a first continuous byte array with the first flow identifier, copy an operation result of the logical AND operation to remaining bytes of the first continuous byte array successively, and use content of the first continuous byte array for which the filling and copying are completed, as the first mapping value Mp1, where the first continuous byte array is data of N bytes, and N is a maximum quantity of bytes that can be included in the metadata field of the flow table.

The first mapping value Mp1 obtained in step S4023 may be written into the metadata field, and transferred together with the received packet to the second flow table.

S403. Receive n−1 flow mode messages delivered by the controller for n−1 flow tables.

In this embodiment, the delivering, by the controller, the n−1 flow mode messages for the n−1 flow tables is delivering each flow mode message in the n−1 flow mode messages for each flow table in the n−1 flow tables, that is, delivering an $i^{th}$ flow mode message for an $i^{th}$ flow table, where 2≤i≤n. In this embodiment, the delivering the $i^{th}$ flow mode message for the $i^{th}$ flow table is similar to the delivering the flow mode message for the second flow table in step S103 exemplified in FIG. 1. That is, the $i^{th}$ flow mode message includes an $i^{th}$ jump instruction, an $i^{th}$ match instruction, and an $i^{th}$ metadata value used to match an $i^{th}$ match field, where the $i^{th}$ match instruction is used to map the $i^{th}$ match field onto an $i^{th}$ mapping value.

Different from the example in FIG. 1, in this embodiment, the $i^{th}$ match field is an $((i−1)*Nm+1)^{th}$ byte to an $(i*Nm)^{th}$ byte in the field that needs to match, the $i^{th}$ match instruction includes a parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, and a next flow table of an $n^{th}$ flow table is a last flow table.

S404. Create n−1 flow entries in the n−1 flow tables.

In this embodiment, the creating, by the switch, n−1 flow entries in the n−1 flow tables refers to creating one flow entry in each flow table of the n−1 flow tables. That is, an $i^{th}$ flow entry is created in an $i^{th}$ flow table, a match field of the $i^{th}$ flow entry is an $i^{th}$ metadata value, and an instruction set of the $i^{th}$ flow entry is the $i^{th}$ jump instruction and the $i^{th}$ match instruction.

Different from the matching of a single level of flow table exemplified in FIG. 1, in this embodiment, the match field of the $i^{th}$ flow entry is used to match an $(i−1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is included in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table.

In this embodiment, the parameter that is included in the $i^{th}$ match instruction and that is used to map the $i^{th}$ match field onto the $i^{th}$ mapping value includes: an $i^{th}$ mask, an $i^{th}$ start position of the $i^{th}$ match field in a packet to which the $i^{th}$ match field belongs, an $i^{th}$ quantity of offset bytes of the $i^{th}$ match field in the packet to which the $i^{th}$ match field belongs, and an $i^{th}$ flow identifier of a data flow that includes the packet to which the $i^{th}$ match field belongs. In an embodiment of the present disclosure, the mapping the $i^{th}$ match field onto an $i^{th}$ mapping value Mpi according to the parameter that is included in the $i^{th}$ match instruction and that is used to map the $i^{th}$ match field onto the $i^{th}$ mapping value includes the following step S4041 to step S4043:

S4041. Locate the $i^{th}$ match field in the received packet according to the $i^{th}$ start position and the $i^{th}$ quantity of offset bytes, and extract the $i^{th}$ match field.

S4042. Perform a logical AND operation on the extracted $i^{th}$ match field and the $i^{th}$ mask.

S4043. Fill an initial byte of an $i^{th}$ continuous byte array with the $i^{th}$ flow identifier, copying an operation result of the logical AND operation in step S4042 to remaining bytes of the $i^{th}$ continuous byte array successively, and using content of the $i^{th}$ continuous byte array for which the filling and copying are completed, as the $i^{th}$ mapping value Mpi, where the $i^{th}$ continuous byte array is data of N bytes.

The mapping value Mpi obtained in step S4023 may be written into the metadata field of the $i^{th}$ flow table, and transferred together with the received packet to a next flow table of the $i^{th}$ flow table, namely, an $(i+1)^{th}$ flow table.

S405. Receive a last flow mode message delivered by the controller for a last flow table.

The last flow mode message includes an $n^{th}$ metadata value used to match the $n^{th}$ match field, and an action instruction, where the action instruction is used to indicate an action to be performed when the last flow table is accessed.

S406. Create a last flow entry in the last flow table.

An instruction set of the last flow entry is an action instruction, a match field of the last flow entry is an $n^{th}$ metadata value, the match field of the last flow entry is used to match the $n^{th}$ metadata value with an $n^{th}$ mapping value Mpn included in the last flow mode message delivered by the controller for the last flow table in step S405, and the action instruction is used to process the packet according to a matching result, for example, drop (drop) the packet, modify (modify) the packet, forward the packet to a port (forward to port), or forward the packet to the controller (forward to controller).

By using forbidding of an application WeChat as an example, the following gives further description about the flow table matching method applied when multiple levels of flow tables are concatenated according to the foregoing embodiment of the present disclosure.

A feature code of an application protocol of the application WeChat is a feature code that includes 21 bytes. It is assumed that the feature code is: a first byte (byte1)=0x01, a second byte (byte2)=0x02, a third byte (byte3)=0x03, a fourth byte (byte4)=0x04, . . . , a 21$^{st}$ byte (byte21)=0x21, and an OpenFlow controller predefines the type of the application WeChat to 0x22.

Because the feature code of the application protocol of WeChat includes 21 bytes, as calculated by the OpenFlow controller, 21/7=3 levels of flow tables are required. That is, at least three flow tables (which is hereinafter referred to as a three-level flow table for short) need to be concatenated to enable matching on this application, which includes the following step S1 to step S6:

S1. The OpenFlow controller delivers a first jump instruction and a first match instruction that are for a first flow table to an OpenFlow switch.

The first match instruction delivered by the OpenFlow controller includes a parameter used to map a first match field onto a first mapping value Mp1, and the first jump instruction is used to instruct the OpenFlow switch to jump to a second flow table (denoted as Table N+1) in the three-level flow table.

S2. The OpenFlow switch creates a first flow entry in Table N.

An instruction set of the first flow entry created in Table N is the first jump instruction and the first match instruction that are delivered by the OpenFlow controller, where the first match instruction is used to instruct the OpenFlow switch to map first 7 bytes of the first match field, namely, the feature code that includes 21 bytes, onto the first mapping value Mp1 when a packet of WeChat passes through a first flow table (denoted as Table N) in the three-level flow table, and the first jump instruction is used to jump to the second flow table and transfer, to the second flow table (denoted as Table N+1) in the three-level flow table, the packet and the first mapping value Mp1 written in the metadata field.

S3. Receive 2 flow mode messages delivered by the OpenFlow controller for the second flow table and a third flow table in the three-level flow table.

A $2^{nd}$ flow mode message is delivered for the second flow table, and a $3^{rd}$ flow mode message is delivered for a third flow table (denoted as Table N+2), where the $2^{nd}$ flow mode message includes a $2^{nd}$ jump instruction, a $2^{nd}$ match instruction, and a $2^{nd}$ metadata value used to match a $2^{nd}$ match field. The $2^{nd}$ match instruction is used to map 7 middle bytes of the $2^{nd}$ match field, namely, the feature code that includes 21 bytes, onto the $2^{nd}$ mapping value Mp2. The $2^{nd}$ match instruction includes a parameter used to map the $2^{nd}$ match field onto the $2^{nd}$ mapping value Mp2, and the $2^{nd}$ jump instruction is used to jump to a next flow table. The $3^{rd}$ flow mode message includes a $3^{rd}$ jump instruction, a $3^{rd}$ match instruction, and a $3^{rd}$ metadata value used to match a $3^{rd}$ match field. The $3^{rd}$ match instruction is used to map last 7 bytes of the $3^{rd}$ match field, namely, the feature code that includes 21 bytes, onto the $3^{rd}$ mapping value Mp3. The $3^{rd}$ match instruction includes a parameter used to map the $3^{rd}$ match field onto the $3^{rd}$ mapping value Mp3, and the $3^{rd}$ jump instruction is used to jump to a next flow table, namely, a last flow table. The $2^{nd}$ metadata value is 0x2201020304050607, and the $3^{rd}$ metadata value is 0x2208091011121314.

S4. Create 2 flow entries in remaining 2 flow tables in the three-level flow table.

The OpenFlow switches creates a $2^{nd}$ flow entry in the $2^{nd}$ flow table, and creates a $3^{rd}$ flow entry in the $3^{rd}$ flow table. An instruction set of the $2^{nd}$ flow entry is the $2^{nd}$ jump instruction and the $2^{nd}$ match instruction, and a match field of the $2^{nd}$ flow entry is the $2^{nd}$ metadata value, namely, 0x2201020304050607. The OpenFlow switch matches 0x2201020304050607 with the first mapping value Mp1 according to the $2^{nd}$ match instruction, and executes the $2^{nd}$ jump instruction and the $2^{nd}$ match instruction according to a matching result. The $2^{nd}$ match instruction is used by the OpenFlow switch to map the $2^{nd}$ match field onto the $2^{nd}$ mapping value Mp2 according to the parameter that is included in the $2^{nd}$ match instruction and that is used to map the $2^{nd}$ match field onto the $2^{nd}$ mapping value Mp2, and write the $2^{nd}$ mapping value Mp2 into the metadata field of the $2^{nd}$ flow table. The $2^{nd}$ jump instruction is used to jump to a next flow table of the $2^{nd}$ flow table, namely, a third flow table (denoted as Table N+2) in the three-level flow table, and transfer, to the next flow table of the $2^{nd}$ flow table, namely, the third flow table in the three-level flow table, the packet of WeChat and the second mapping value Mp2 written in the metadata field of the $2^{nd}$ flow table, where the $2^{nd}$ flow table is the second flow table Table N+1 in the three-level flow table. An instruction set of the $3^{rd}$ flow entry is the 3rd jump instruction and the $3^{rd}$ match instruction, a match field of the $3^{rd}$ flow entry is the $3^{rd}$ metadata value, namely, 0x2208091011121314, and the match field of the $3^{rd}$ flow entry is used to match the second mapping value Mp2. The OpenFlow switch matches 0x2208091011121314 with the second mapping value Mp2 according to the $3^{rd}$ match instruction, and executes the $3^{rd}$ jump instruction and the $3^{rd}$ match instruction according to a matching result. The $3^{rd}$ match instruction is used to map the $3^{rd}$ match field onto the $3^{rd}$ mapping value Mp3 according to the parameter that is included in the $3^{rd}$ match instruction and that is used to map the $3^{rd}$ match field onto the $3^{rd}$ mapping value Mp3, and write the $3^{rd}$ mapping value Mp3 into a metadata field of the $3^{rd}$ flow table. The $3^{rd}$ jump instruction is used to jump to a next flow table of the $3^{rd}$ flow table, namely, a last flow table, and transfer, to the next flow table of the $3^{rd}$ flow table, namely, the last flow table, the packet of WeChat and the third mapping value Mp3 written in the metadata field of the $3^{rd}$ flow table.

S5. Receive a last flow mode message delivered by the OpenFlow controller for a last flow table.

The last flow mode message delivered for the last flow table includes an action instruction and a $4^{th}$ metadata value, namely, 0x2215161718192021, that is used to match the $3^{rd}$ match field. For a purpose of this application scenario, namely, to forbid the application WeChat, the action instruction included in the last flow mode message is to drop (drop) the packet.

S6. Create a last flow entry in the last flow table.

An instruction set of the last flow entry is an action instruction included in the last flow mode message delivered by the OpenFlow controller for the last flow table, and a match field of the last flow entry is the $4^{th}$ metadata value, namely, 0x2215161718192021. After creating the last flow entry in the last flow table, the OpenFlow switch matches the metadata value, namely, 0x2215161718192021, of the match field of the last flow entry with the transferred third mapping value Mp3.

If the matching succeeds, an operation of dropping (drop) the packet is performed according to the action instruction, thereby intercepting the packet of WeChat and fulfilling the purpose of forbidding the application WeChat.

The following describes a flow table matching apparatus according to an embodiment of the present disclosure, which is used to perform the flow table matching method. For basic logical structure of the apparatus, refer to FIG. 5. For ease of description, only the part related to the embodiment of the present disclosure is shown. The flow table matching apparatus exemplified in FIG. 5 may be a switch in an OpenFlow network, and primarily includes a first receiving module 501, a first creating module 502, a second receiving module 503, and a second creating module 504. The modules are described below in detail:

The first receiving module 501 is configured to receive a jump instruction and a match instruction that are delivered by a controller for a first flow table, where the match instruction is used to map a match field onto a mapping value, write the mapping value into a metadata field, and transfer the mapping value to a second flow table, the match instruction includes a parameter used to map the match field onto the mapping value, and the jump instruction is used to jump to the second flow table.

The first creating module 502 is configured to create a first flow entry in the first flow table, where an instruction set of the first flow entry is the jump instruction and the match instruction, the match instruction is used to, after a switch receives a packet, map the match field onto a mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field.

The second receiving module 503 is configured to receive a flow mode message delivered by the controller for the second flow table, where the flow mode message includes an action instruction and a metadata value that is used to match the match field.

The second creating module 504 is configured to create a second flow entry in the second flow table, where an instruction set of the second flow entry is the action instruction, a match field of the second flow entry is the metadata value, the match field of the second flow entry is used to match the mapping value Mp, and the action instruction is used to process the packet according to a matching result.

Figure 5:
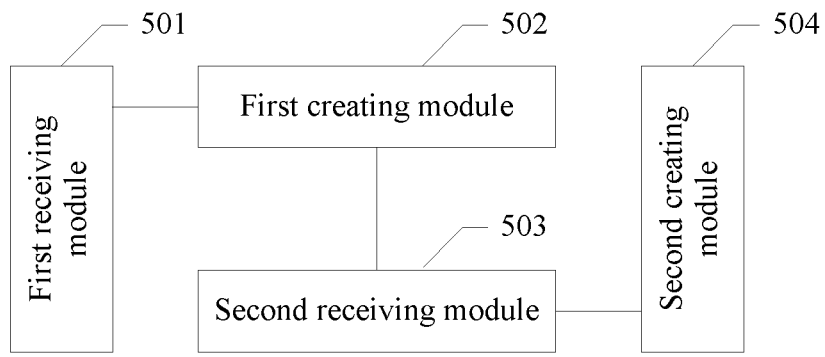
FIG. 5 is a schematic diagram of a basic logical structure of a flow table matching apparatus according to an embodiment of the present disclosure.

It should be noted that, in the implementation manner of the flow table matching apparatus exemplified in FIG. 5, the division of function modules is merely used as an example. In practical application, the functions may be assigned to different function modules for completion according to a requirement, for example, a corresponding hardware configuration requirement or software implementation convenience. That is, an internal structure of the flow table matching apparatus may be divided into different function modules to complete all or part of the functions described above. In addition, in practical application, a corresponding function module in this embodiment may be implemented by corresponding hardware, or may be implemented by the corresponding hardware by executing corresponding software. For example, the first receiving module may be hardware with a function of receiving the jump instruction and the match instruction that are delivered by the controller for the first flow table, such as the first receiver, or may be a general processor or another hardware device capable of executing a corresponding computer program to implement the function. For another example, the first creating module may be hardware with a function of creating the first flow entry in the first flow table, such as a first establisher, or may be a general processor or another hardware device capable of executing a corresponding computer program to implement the function (such principles described above are applicable to all embodiments provided in this specification).

In the flow table matching apparatus exemplified in FIG. 5, the parameter that is included in the match instruction and that is used to map the match field onto the mapping value includes: a mask, a start position of the match field in a packet to which the match field belongs, a quantity of offset bytes of the match field in the packet to which the match field belongs, and a flow identifier of a data flow that includes the packet to which the match field belongs; and the mapping the match field onto a mapping value Mp according to the parameter that is included in the match instruction and that is used to map the match field onto the mapping value includes: locating the match field in the received packet according to the start position and the quantity of offset bytes, and extracting the match field; performing a logical AND operation on the extracted match field and the mask; and filling an initial byte of a continuous byte array with the flow identifier, copying an operation result of the logical AND operation to remaining bytes of the continuous byte array successively, and using content of the continuous byte array for which the filling and copying are completed, as the mapping value Mp, where the continuous byte array is data of N bytes, and N is a maximum quantity of bytes that can be included in the metadata field of the flow table.

Figure 6:
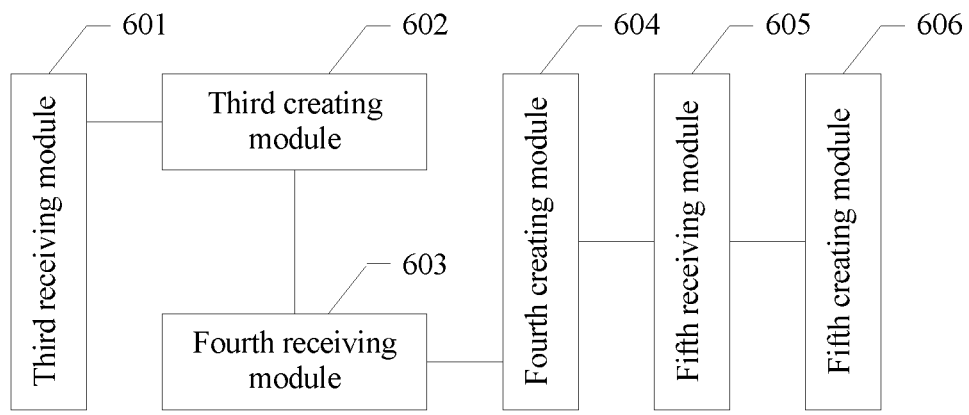
FIG. 6 is a schematic diagram of a basic logical structure of a flow table matching apparatus according to another embodiment of the present disclosure.

Referring to FIG. 6, FIG. 6 shows a flow table matching apparatus according to another embodiment of the present disclosure, and the apparatus is applicable to a scenario of concatenating multiple flow tables. For ease of description, only the part related to the embodiment of the present disclosure is shown. The flow table matching apparatus exemplified in FIG. 6 may be a switch in an OpenFlow network, and primarily includes a third receiving module 601, a third creating module 602, a fourth receiving module 603, a fourth creating module 604, a fifth receiving module 605, and a fifth creating module 606. The modules are described below in detail:

The third receiving module 601 is configured to receive a first jump instruction and a first match instruction that are delivered by a controller for a first flow table, where the first match instruction is used to map a first match field onto a first mapping value, write the first mapping value into a metadata field, and transfer the first mapping value to a second flow table, the first match instruction includes a parameter used to map the first match field onto the first mapping value, the first jump instruction is used to jump to the second flow table, a field that needs to match includes Nb bytes, Nb=n*Nm, n is an integer greater than 1, Nm is equal to a maximum quantity of bytes that can be included in the metadata field of the flow table, and the first match field is a $1^{st}$ byte to an $Nm^{th}$ byte in the field that needs to match.

The third creating module 602 is configured to create a first flow entry in the first flow table, where an instruction set of the first flow entry is the first jump instruction and the first match instruction, the first match instruction is used to, after a switch receives a packet, map the first match field onto the first mapping value Mp1 according to the parameter that is included in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table.

The fourth receiving module 603 is configured to receive n−1 flow mode messages delivered by the controller for n−1 flow tables, where an $i^{th}$ flow mode message is delivered for an $i^{th}$ flow table, n≥i≥2, the $i^{th}$ flow mode message includes an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction includes the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, and a next flow table of an $n^{th}$ flow table is a last flow table.

The fourth creating module 604 is configured to create n−1 flow entries in the n−1 flow tables, where the $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is included in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table.

The fifth receiving module 605 is configured to receive a last flow mode message delivered by the controller for the last flow table, where the last flow mode message includes an action instruction and an $n^{th}$ metadata value that is used to match an $n^{th}$ match field.

The fifth creating module 606 is configured to create a last flow entry in the last flow table, where an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

In the flow table matching apparatus exemplified in FIG. 6, the parameter that is included in the first match instruction and that is used to map the first match field onto the first mapping value includes: a first mask, a first start position of the first match field in a packet to which the first match field belongs, a first quantity of offset bytes of the first match field in the packet to which the first match field belongs, and a first flow identifier of a data flow that includes the packet to which the first match field belongs; and the mapping the first match field onto a first mapping value Mp1 according to the parameter that is included in the first match instruction and that is used to map the first match field onto the first mapping value includes: locating the first match field in the received packet according to the first start position and the first quantity of offset bytes, and extracting the first match field; performing a logical AND operation on the extracted first match field and the first mask; and filling an initial byte of a first continuous byte array with the first flow identifier, copying an operation result of the logical AND operation to remaining bytes of the first continuous byte array successively, and using content of the first continuous byte array for which the filling and copying are completed, as the first mapping value Mp1, where the first continuous byte array is data of N bytes, and N is a maximum quantity of bytes that can be included in the metadata field of the flow table.

The parameter that is included in the $i^{th}$ match instruction and that is used to map the $i^{th}$ match field onto the $i^{th}$ mapping value includes: an $i^{th}$ mask, an $i^{th}$ start position of the $i^{th}$ match field in a packet to which the $i^{th}$ match field belongs, an $i^{th}$ quantity of offset bytes of the $i^{th}$ match field in the packet to which the $i^{th}$ match field belongs, and an $i^{th}$ flow identifier of a data flow that includes the packet to which the $i^{th}$ match field belongs; and the mapping the $i^{th}$ match field onto an $i^{th}$ mapping value Mpi according to the parameter that is included in the $i^{th}$ match instruction and that is used to map the $i^{th}$ match field onto the $i^{th}$ mapping value includes: locating the $i^{th}$ match field in the received packet according to the $i^{th}$ start position and the $i^{th}$ quantity of offset bytes, and extracting the $i^{th}$ match field; performing a logical AND operation on the extracted $i^{th}$ match field and the $i^{th}$ mask; and filling an initial byte of an $i^{th}$ continuous byte array with the $i^{th}$ flow identifier, copying an operation result of the logical AND operation to remaining bytes of the $i^{th}$ continuous byte array successively, and using content of the $i^{th}$ continuous byte array for which the filling and copying are completed, as the $i^{th}$ mapping value Mpi, where the $i^{th}$ continuous byte array is data of N bytes.

Figure 7:
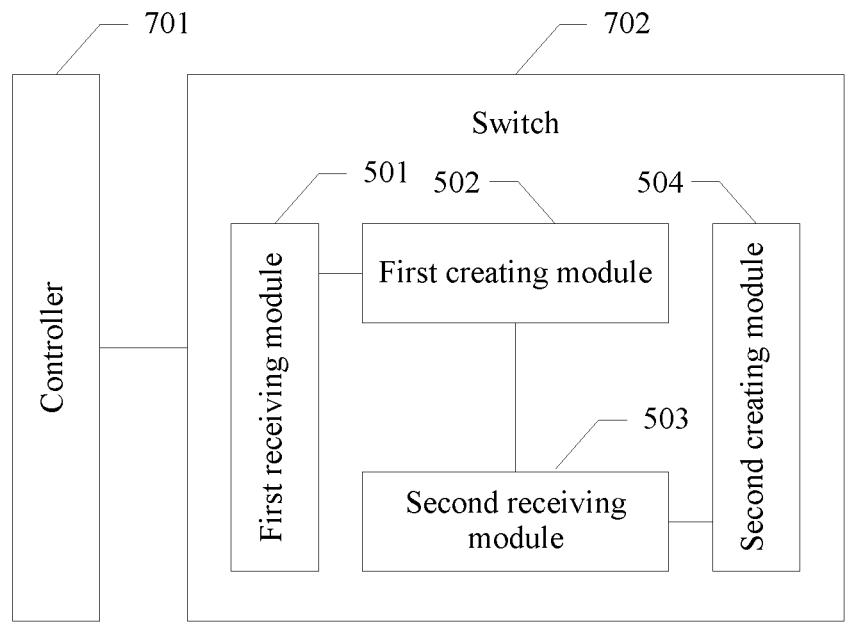
FIG. 7 is a schematic diagram of a logical structure of an OpenFlow switching system according to an embodiment of the present disclosure.

Referring to FIG. 7, FIG. 7 shows an OpenFlow switching system provided in an embodiment of the present disclosure. For ease of description, only the part related to the embodiment of the present disclosure is shown. The OpenFlow switching system exemplified in FIG. 7 includes a switch 702 and a controller 701, where the switch 702 may be the flow table matching apparatus exemplified in FIG. 5. The switch 702 primarily includes a first receiving module 501, a first creating module 502, a second receiving module 503, and a second creating module 504. The modules are described below in detail:

The controller 701 is configured to deliver a jump instruction and a match instruction that are for a first flow table to the switch 702, and deliver a flow mode message for a second flow table to the switch 702, where the match instruction is used to instruct the switch 702 to map a match field onto a mapping value, write the mapping value into a metadata field, and transfer the mapping value to the second flow table, the match instruction includes a parameter used to map the match field onto the mapping value, and the jump instruction is used to jump to the second flow table, and the flow mode message includes an action instruction and a metadata value that is used to match the match field.

The first receiving module 501 is configured to receive the jump instruction and the match instruction that are delivered by the controller for the first flow table.

The first creating module 502 is configured to create a first flow entry in the first flow table, where an instruction set of the first flow entry is the jump instruction and the match instruction, the match instruction is used to, after a switch receives a packet, map the match field onto a mapping value Mp according to the parameter that is included in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field.

The second receiving module 503 is configured to receive a flow mode message delivered by the controller 701 for the second flow table, where the flow mode message includes an action instruction and a metadata value that is used to match the match field.

The second creating module 504 is configured to create a second flow entry in the second flow table, where an instruction set of the second flow entry is the action instruction, a match field of the second flow entry is the metadata value, the match field of the second flow entry is used to match the mapping value Mp, and the action instruction is used to process the packet according to a matching result.

In the OpenFlow switching system exemplified in FIG. 7, the parameter that is included in the match instruction and that is used to map the match field onto the mapping value includes: a mask, a start position of the match field in a packet to which the match field belongs, a quantity of offset bytes of the match field in the packet to which the match field belongs, and a flow identifier of a data flow that includes the packet to which the match field belongs; and the mapping the match field onto a mapping value Mp according to the parameter that is included in the match instruction and that is used to map the match field onto the mapping value includes: locating the match field in the received packet according to the start position and the quantity of offset bytes, and extracting the match field; performing a logical AND operation on the extracted match field and the mask; and filling an initial byte of a continuous byte array with the flow identifier, copying an operation result of the logical AND operation to remaining bytes of the continuous byte array successively, and using content of the continuous byte array for which the filling and copying are completed, as the mapping value Mp, where the continuous byte array is data of N bytes, and N is a maximum quantity of bytes that can be included in the metadata field of the flow table.

Figure 8:
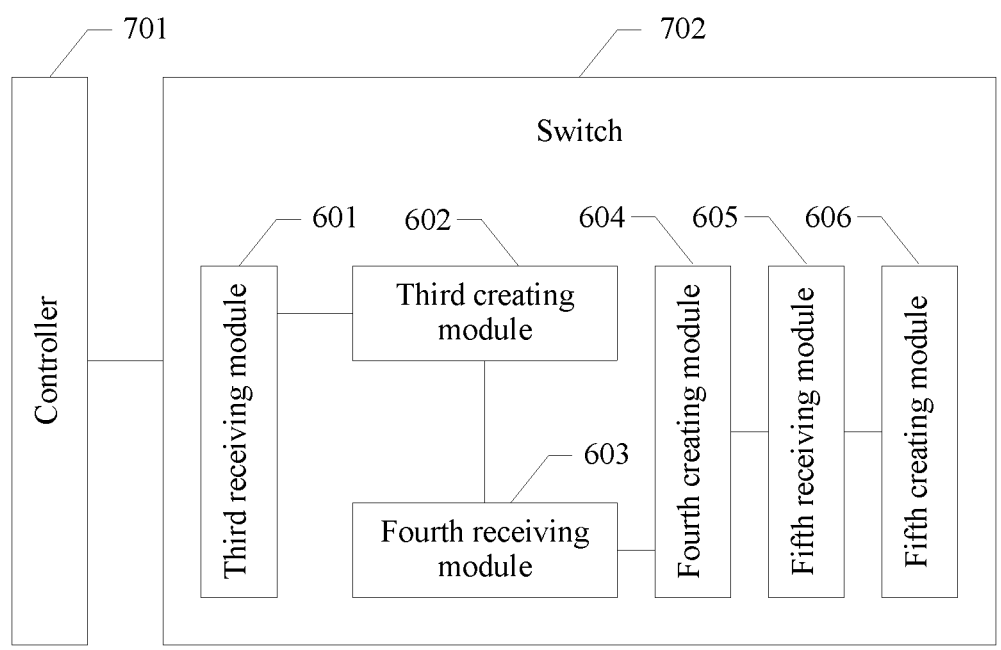
FIG. 8 is a schematic diagram of a logical structure of an OpenFlow switching system according to another embodiment of the present disclosure.

Referring to FIG. 8, FIG. 8 shows an OpenFlow switching system provided in another embodiment of the present disclosure. For ease of description, only the part related to the embodiment of the present disclosure is shown. The OpenFlow switching system exemplified in FIG. 8 includes a switch 802 and a controller 801, where the switch 802 may be the apparatus that is exemplified in FIG. 6 and that is used to expand a match range of a match field of a flow table. The switch 802 primarily includes a third receiving module 601, a third creating module 602, a fourth receiving module 603, a fourth creating module 604, a fifth receiving module 605, and a fifth creating module 606. The modules are described below in detail:

The controller 801 is configured to: deliver a first jump instruction and a first match instruction that are for a first flow table to the switch 802, deliver n−1 flow mode messages for n−1 flow tables to the switch 802, and deliver a last flow mode message for a last flow table to the switch 802, where the first match instruction is used to instruct the switch 802 to map a first match field onto a first mapping value, write the first mapping value into a metadata field, and transfer the first mapping value to a second flow table, the first match instruction includes a parameter used to map the first match field onto the first mapping value, the first jump instruction is used to jump to the second flow table, a field that needs to match includes Nb bytes, Nb=n*Nm, n is an integer greater than 1, Nm is equal to a maximum quantity of bytes that can be included in the metadata field of a flow table, the first match field is a $1^{st}$ byte to an $Nm^{th}$ byte in the field that needs to match, an $i^{th}$ flow mode message is delivered for an $i^{th}$ flow table, n≥i≥2, the $i^{th}$ flow mode message includes an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction includes the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, a next flow table of an $n^{th}$ flow table is the last flow table, and the last flow mode message includes an action instruction and an $n^{th}$ metadata value that is used to match an $n^{th}$ match field.

The third receiving module 601 is configured to receive the first jump instruction and the first match instruction that are delivered by the controller 801 for the first flow table.

The third creating module 602 is configured to create a first flow entry in the first flow table, where an instruction set of the first flow entry is the first jump instruction and the first match instruction, the first match instruction is used to, after a switch receives a packet, map the first match field onto the first mapping value Mp1 according to the parameter that is included in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table.

The fourth receiving module 603 is configured to receive the n−1 flow mode messages delivered by the controller 801 for the n−1 flow tables.

The fourth creating module 604 is configured to create n−1 flow entries in the n−1 flow tables, where the $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is included in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table.

The fifth receiving module 605 is configured to receive the last flow mode message delivered by the controller 801 for the last flow table.

The fifth creating module 606 is configured to create a last flow entry in the last flow table, where an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

In the OpenFlow switching system exemplified in FIG. 8, the parameter that is included in the first match instruction and that is used to map the first match field onto the first mapping value includes: a first mask, a first start position of the first match field in a packet to which the first match field belongs, a first quantity of offset bytes of the first match field in the packet to which the first match field belongs, and a first flow identifier of a data flow that includes the packet to which the first match field belongs; and the mapping the first match field onto a first mapping value Mp1 according to the parameter that is included in the first match instruction and that is used to map the first match field onto the first mapping value includes: locating the first match field in the received packet according to the first start position and the first quantity of offset bytes, and extracting the first match field; performing a logical AND operation on the extracted first match field and the first mask; and filling an initial byte of a first continuous byte array with the first flow identifier, copying an operation result of the logical AND operation to remaining bytes of the first continuous byte array successively, and using content of the first continuous byte array for which the filling and copying are completed, as the first mapping value Mp1, where the first continuous byte array is data of N bytes, and N is a maximum quantity of bytes that can be included in the metadata field of the flow table.

The parameter that is included in the $i^{th}$ match instruction and that is used to map the $i^{th}$ match field onto the $i^{th}$ mapping value includes: an $i^{th}$ mask, an $i^{th}$ start position of the $i^{th}$ match field in a packet to which the $i^{th}$ match field belongs, an $i^{th}$ quantity of offset bytes of the $i^{th}$ match field in the packet to which the $i^{th}$ match field belongs, and an $i^{th}$ flow identifier of a data flow that includes the packet to which the $i^{th}$ match field belongs; and the mapping the $i^{th}$ match field onto an $i^{th}$ mapping value Mpi according to the parameter that is included in the $i^{th}$ match instruction and that is used to map the $i^{th}$ match field onto the $i^{th}$ mapping value includes: locating the $i^{th}$ match field in the received packet according to the $i^{th}$ start position and the $i^{th}$ quantity of offset bytes, and extracting the $i^{th}$ match field; performing a logical AND operation on the extracted $i^{th}$ match field and the $i^{th}$ mask; and filling an initial byte of an $i^{th}$ continuous byte array with the $i^{th}$ flow identifier, copying an operation result of the logical AND operation to remaining bytes of the $i^{th}$ continuous byte array successively, and using content of the $i^{th}$ continuous byte array for which the filling and copying are completed, as the $i^{th}$ mapping value Mpi, where the $i^{th}$ continuous byte array is data of N bytes.

It should be noted that content such as information exchange between the modules/units of the apparatus and the execution processes thereof is based on the same idea as the method embodiments of the present disclosure, and produces the same technical effects as the method embodiments of the present disclosure. For the specific content, reference may be made to the description in the method embodiments of the present disclosure, and the details are not described herein again.

A person of ordinary skill in the art may understand that all or some of the steps of the methods in the embodiments may be implemented by a program instructing relevant hardware. The program may be stored in a computer-readable storage medium. The storage medium may include: a read-only memory (ROM), a random access memory (RAM), a magnetic disk, or an optical disc.

The foregoing has given detailed description about a flow table matching method and apparatus and an OpenFlow switching system according to an embodiment of the present disclosure. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A flow table matching method, wherein the method comprises:
   receiving a jump instruction and a match instruction that are delivered by a controller for a first flow table, wherein the match instruction is used to map a match field onto a mapping value, write the mapping value into a metadata field, and transfer the mapping value to a second flow table, the match instruction comprises a parameter used to map the match field onto the mapping value, and the jump instruction is used to jump to the second flow table;
   creating a first flow entry in the first flow table, wherein an instruction set of the first flow entry is the jump instruction and the match instruction, the match instruction is used to, after a switch receives a packet, map the match field onto a mapping value Mp according to the parameter that is comprised in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field;
   receiving a flow mode message delivered by the controller for the second flow table, wherein the flow mode message comprises an action instruction and a metadata value that is used to match the match field; and
   creating a second flow entry in the second flow table, wherein an instruction set of the second flow entry is the action instruction, a match field of the second flow entry is the metadata value, the match field of the second flow entry is used to match the mapping value Mp, and the action instruction is used to process the packet according to a matching result.

2. The method according to claim 1, wherein the parameter that is comprised in the match instruction and that is used to map the match field onto the mapping value comprises: a mask, a start position of the match field in a packet to which the match field belongs, a quantity of offset bytes of the match field in the packet to which the match field belongs, and a flow identifier of a data flow that comprises the packet to which the match field belongs; and
   the mapping the match field onto a mapping value Mp according to the parameter that is comprised in the match instruction and that is used to map the match field onto the mapping value comprises:
   locating the match field in the received packet according to the start position and the quantity of offset bytes, and extracting the match field;
   performing a logical AND operation on the extracted match field and the mask; and
   filling an initial byte of a continuous byte array with the flow identifier, copying an operation result of the logical AND operation to remaining bytes of the continuous byte array successively, and using content of the continuous byte array for which the filling and copying are completed, as the mapping value Mp, wherein the continuous byte array is data of N bytes, and N is a maximum quantity of bytes that can be comprised in the metadata field of the flow table.

3. A flow table matching method, wherein the method comprises:
   receiving a first jump instruction and a first match instruction that are delivered by a controller for a first flow table, wherein the first match instruction is used to map a first match field onto a first mapping value, write the first mapping value into a metadata field, and transfer the first mapping value to a second flow table, the first match instruction comprises a parameter used to map the first match field onto the first mapping value, the first jump instruction is used to jump to the second flow table, a field that needs to match comprises Nb bytes, Nb=n*Nm, n is an integer greater than 1, Nm is equal to a maximum quantity of bytes that can be comprised in the metadata field of the flow table, and the first match field is a $1^{st}$ byte to an $Nm^{th}$ byte in the field that needs to match;
   creating a first flow entry in the first flow table, wherein an instruction set of the first flow entry is the first jump instruction and the first match instruction, the first match instruction is used to, after a switch receives a packet, map the first match field onto the first mapping value Mp1 according to the parameter that is comprised in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table;

receiving n−1 flow mode messages delivered by the controller for n−1 flow tables, wherein an $i^{th}$ flow mode message is delivered for an $i^{th}$ flow table, n≥i≥2, the $i^{th}$ flow mode message comprises an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction comprises the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, and a next flow table of an $n^{th}$ flow table is a last flow table;

creating n−1 flow entries in the n−1 flow tables, wherein an $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is comprised in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table;

receiving a last flow mode message delivered by the controller for the last flow table, wherein the last flow mode message comprises an action instruction and an $n^{th}$ metadata value that is used to match an $n^{th}$ match field; and creating a last flow entry in the last flow table, wherein an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

4. The method according to claim 3, wherein the parameter that is comprised in the first match instruction and that is used to map the first match field onto the first mapping value comprises: a first mask, a first start position of the first match field in a packet to which the first match field belongs, a first quantity of offset bytes of the first match field in the packet to which the first match field belongs, and a first flow identifier of a data flow that comprises the packet to which the first match field belongs, and the mapping the first match field onto a first mapping value Mp1 according to the parameter that is comprised in the first match instruction and that is used to map the first match field onto the first mapping value comprises:

locating the first match field in the received packet according to the first start position and the first quantity of offset bytes, and extracting the first match field;

performing a logical AND operation on the extracted first match field and the first mask; and filling an initial byte of a first continuous byte array with the first flow identifier, copying an operation result of the logical AND operation to remaining bytes of the first continuous byte array successively, and using content of the first continuous byte array for which the filling and copying are completed, as the first mapping value Mp1, wherein the first continuous byte array is data of N bytes, and N is a maximum quantity of bytes that can be comprised in the metadata field of the flow table; and the parameter that is comprised in the $i^{th}$ match instruction and that is used to map the $i^{th}$ match field onto the $i^{th}$ mapping value comprises: an $i^{th}$ mask, an $i^{th}$ start position of the $i^{th}$ match field in a packet to which the $i^{th}$ match field belongs, an $i^{th}$ quantity of offset bytes of the $i^{th}$ match field in the packet to which the $i^{th}$ match field belongs, and an $i^{th}$ flow identifier of a data flow that comprises the packet to which the $i^{th}$ match field belongs, and the mapping the $i^{th}$ match field onto an $i^{th}$ mapping value Mpi according to the parameter that is comprised in the $i^{th}$ match instruction and that is used to map the $i^{th}$ match field onto the $i^{th}$ mapping value comprises:

locating the $i^{th}$ match field in the received packet according to the $i^{th}$ start position and the $i^{th}$ quantity of offset bytes, and extracting the $i^{th}$ match field;

performing a logical AND operation on the extracted $i^{th}$ match field and the $i^{th}$ mask; and filling an initial byte of an $i^{th}$ continuous byte array with the $i^{th}$ flow identifier, copying an operation result of the logical AND operation to remaining bytes of the $i^{th}$ continuous byte array successively, and using content of the $i^{th}$ continuous byte array for which the filling and copying are completed, as the $i^{th}$ mapping value Mpi, wherein the $i^{th}$ continuous byte array is data of N bytes.

5. A flow table matching apparatus, comprising:
a processor; and
a non-transitory computer-readable storage medium coupled to the processor and storing programming instructions for execution by the processor, the programming instructions instruct the processor to:

receive a jump instruction and a match instruction that are delivered by a controller for a first flow table, wherein the match instruction is used to map a match field onto a mapping value, write the mapping value into a metadata field, and transfer the mapping value to a second flow table, the match instruction comprises a parameter used to map the match field onto the mapping value, and the jump instruction is used to jump to the second flow table;

create a first flow entry in the first flow table, wherein an instruction set of the first flow entry is the jump instruction and the match instruction, the match instruction is used to, after a switch receives a packet, map the match field onto a mapping value Mp according to the parameter that is comprised in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field;

receive a flow mode message delivered by the controller for the second flow table, wherein the flow mode message comprises an action instruction and a metadata value that is used to match the match field; and create a second flow entry in the second flow table, wherein an instruction set of the second flow entry is the action instruction, a match field of the second flow entry is the metadata value, the match field of the second flow entry is used to match the mapping value Mp, and the action instruction is used to process the packet according to a matching result.

6. The apparatus according to claim 5, wherein the parameter that is comprised in the match instruction and that is used to map the match field onto the mapping value comprises: a mask, a start position of the match field in a packet to which the match field belongs, a quantity of offset bytes of the match field in the packet to which the match field belongs, and a flow identifier of a data flow that comprises the packet to which the match field belongs; and the mapping the match field onto a mapping value Mp according to the parameter that is comprised in the match instruction and that is used to map the match field onto the mapping value comprises:

locating the match field in the received packet according to the start position and the quantity of offset bytes, and extracting the match field;

performing a logical AND operation on the extracted match field and the mask; and filling an initial byte of a continuous byte array with the flow identifier, copying an operation result of the logical AND operation to remaining bytes of the continuous byte array successively, and using content of the continuous byte array for which the filling and copying are completed, as the mapping value Mp, wherein the continuous byte array is data of N bytes, and N is a maximum quantity of bytes that can be comprised in the metadata field of the flow table.

7. A flow table matching apparatus, comprising:

a processor; and a non-transitory computer-readable storage medium coupled to the processor and storing programming instructions for execution by the processor, the programming instructions instruct the processor to:

receive a first jump instruction and a first match instruction that are delivered by a controller for a first flow table, wherein the first match instruction is used to map a first match field onto a first mapping value, write the first mapping value into a metadata field, and transfer the first mapping value to a second flow table, the first match instruction comprises a parameter used to map the first match field onto the first mapping value, the first jump instruction is used to jump to the second flow table, a field that needs to match comprises Nb bytes, Nb=n*Nm, n is an integer greater than 1, Nm is equal to a maximum quantity of bytes that can be comprised in the metadata field of the flow table, and the first match field is a $1^{st}$ byte to an $Nm^{th}$ byte in the field that needs to match;

create a first flow entry in the first flow table, wherein an instruction set of the first flow entry is the first jump instruction and the first match instruction, the first match instruction is used to, after a switch receives a packet, map the first match field onto the first mapping value Mp1 according to the parameter that is comprised in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table;

receive n−1 flow mode messages delivered by the controller for n−1 flow tables, wherein an $i^{th}$ flow mode message is delivered for an $i^{th}$ flow table, n≥i≥2, the $i^{th}$ flow mode message comprises an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction comprises the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, and a next flow table of an $n^{th}$ flow table is a last flow table;

create n−1 flow entries in the n−1 flow tables, wherein an $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is comprised in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table;

receive a last flow mode message delivered by the controller for the last flow table, wherein the last flow mode message comprises an action instruction and an $n^{th}$ metadata value that is used to match an $n^{th}$ match field; and create a last flow entry in the last flow table, wherein an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

8. The apparatus according to claim 7, wherein the parameter that is comprised in the first match instruction and that is used to map the first match field onto the first mapping value comprises: a first mask, a first start position of the first match field in a packet to which the first match field belongs, a first quantity of offset bytes of the first match field in the packet to which the first match field belongs, and a first flow identifier of a data flow that comprises the packet to which the first match field belongs, and the mapping the first match field onto a first mapping value Mp1 according to the parameter that is comprised in the first match instruction and that is used to map the first match field onto the first mapping value comprises:

locating the first match field in the received packet according to the first start position and the first quantity of offset bytes, and extracting the first match field;

performing a logical AND operation on the extracted first match field and the first mask; and filling an initial byte of a first continuous byte array with the first flow identifier, copying an operation result of the logical AND operation to remaining bytes of the first continuous byte array successively, and using content of the first continuous byte array for which the filling and copying are completed, as the first mapping value Mp1, wherein the first continuous byte array is data of N bytes, and N is a maximum quantity of bytes that can be comprised in the metadata field of the flow table; and the parameter that is comprised in the $i^{th}$ match instruction and that is used to map the $i^{th}$ match field onto the $i^{th}$ mapping value comprises: an $i^{th}$ mask, an $i^{th}$ start position of the $i^{th}$ match field in a packet to which the $i^{th}$ match field belongs, an $i^{th}$ quantity of offset bytes of the $i^{th}$ match field in the packet to which the $i^{th}$ match field belongs, and an $i^{th}$ flow identifier of a data flow that comprises the packet to which the $i^{th}$ match field belongs, and the mapping the $i^{th}$ match field onto an $i^{th}$ mapping value Mpi according to the parameter that is comprised in the $i^{th}$ match instruction and that is used to map the $i^{th}$ match field onto the $i^{th}$ mapping value comprises:

locating the $i^{th}$ match field in the received packet according to the $i^{th}$ start position and the $i^{th}$ quantity of offset bytes, and extracting the $i^{th}$ match field;

performing a logical AND operation on the extracted $i^{th}$ match field and the $i^{th}$ mask; and filling an initial byte of an $i^{th}$ continuous byte array with the $i^{th}$ flow identifier, copying an operation result of the logical AND operation to remaining bytes of the $i^{th}$ continuous byte array successively, and using content of the $i^{th}$ continuous byte array for which the filling and copying are completed, as the $i^{th}$ mapping value Mpi, wherein the $i^{th}$ continuous byte array is data of N bytes.

9. An OpenFlow switching system, wherein the system comprises:

a switch; and a controller;

the controller is configured to deliver a jump instruction and a match instruction that are for a first flow table to the switch, and deliver a flow mode message for a second flow table to the switch, wherein the match instruction is used to map a match field onto a mapping value, write the mapping value into a metadata field, and transfer the mapping value to the second flow table, the match instruction comprises a parameter used to map the match field onto the mapping value, and the jump instruction is used to jump to the second flow table, and the flow mode message comprises an action instruction and a metadata value that is used to match the match field;

the switch is configured to:

receive the jump instruction and the match instruction that are delivered by the controller for the first flow table;

create a first flow entry in the first flow table, wherein an instruction set of the first flow entry is the jump instruction and the match instruction, the match instruction is used to, after the switch receives a packet, map the match field onto the mapping value Mp according to the parameter that is comprised in the match instruction and that is used to map the match field onto the mapping value, and write the mapping value Mp into the metadata field, and the jump instruction is used to jump to the second flow table, and transfer, to the second flow table, the packet and the mapping value Mp written in the metadata field;

receive the flow mode message delivered by the controller for the second flow table; and create a second flow entry in the second flow table, wherein an instruction set of the second flow entry is the action instruction, a match field of the second flow entry is the metadata value, the match field of the second flow entry is used to match the mapping value Mp, and the action instruction is used to process the packet according to a matching result.

10. The switching system according to claim 9, wherein the parameter that is comprised in the match instruction and that is used to map the match field onto the mapping value comprises: a mask, a start position of the match field in a packet to which the match field belongs, a quantity of offset bytes of the match field in the packet to which the match field belongs, and a flow identifier of a data flow that comprises the packet to which the match field belongs; and the mapping the match field onto a mapping value Mp according to the parameter that is comprised in the match instruction and that is used to map the match field onto the mapping value comprises: locating the match field in the received packet according to the start position and the quantity of offset bytes, and extracting the match field; performing a logical AND operation on the extracted match field and the mask; and filling an initial byte of a continuous byte array with the flow identifier, copying an operation result of the logical AND operation to remaining bytes of the continuous byte array successively, and using content of the continuous byte array for which the filling and copying are completed, as the mapping value Mp, wherein the continuous byte array is data of N bytes, and N is a maximum quantity of bytes that can be comprised in the metadata field of the flow table.

11. An OpenFlow switching system, wherein the system comprises:

a switch; and a controller;

the controller is configured to: deliver a first jump instruction and a first match instruction that are for a first flow table to the switch, deliver n−1 flow mode messages for n−1 flow tables to the switch, and deliver a last flow mode message for a last flow table to the switch, wherein the first match instruction is used to map a first match field onto a first mapping value, write the first mapping value into a metadata field, and transfer the first mapping value to a second flow table, the first match instruction comprises a parameter used to map the first match field onto the first mapping value, the first jump instruction is used to jump to the second flow table, a field that needs to match comprises Nb bytes, Nb=n*Nm, n is an integer greater than 1, Nm is equal to a maximum quantity of bytes that can be comprised in the metadata field of a flow table, the first match field is a $1^{st}$ byte to an $Nm^{th}$ byte in the field that needs to match, an $i^{th}$ flow mode message is delivered for an $i^{th}$ flow table, n≥i≥2, the $i^{th}$ flow mode message comprises an $i^{th}$ jump instruction, an $i^{th}$ match instruction, and an $i^{th}$ metadata value used to match an $i^{th}$ match field, the $i^{th}$ match instruction is used to map the $i^{th}$ match field onto an $i^{th}$ mapping value, the $i^{th}$ match field is an $((i-1)*Nm+1)^{th}$ byte to an $(i*Nm)^{th}$ byte in the field that needs to match, the $i^{th}$ match instruction comprises the parameter used to map the $i^{th}$ match field onto the $i^{th}$ mapping value, the $i^{th}$ jump instruction is used to jump to a next flow table, the second flow table is the $2^{nd}$ flow table, a next flow table of the $i^{th}$ flow table is an $(i+1)^{th}$ flow table, a next flow table of an $n^{th}$ flow table is the last flow table, and the last flow mode message comprises an action instruction and an $n^{th}$ metadata value that is used to match an $n^{th}$ match field;

the switch is configured to:

receive the first jump instruction and the first match instruction that are delivered by the controller for the first flow table;

create a first flow entry in the first flow table, wherein an instruction set of the first flow entry is the first jump instruction and the first match instruction, the first match instruction is used to, after the switch receives a packet, map the first match field onto the first mapping value Mp1 according to the parameter that is comprised in the first match instruction and that is used to map the first match field onto the first mapping value, and write the first mapping value Mp1 into the metadata field of the first flow table, and the first jump instruction is used to jump to the second flow table, and transfer, to the second flow table, the packet and the first mapping value Mp1 written in the metadata field of the first flow table;

receive the n−1 flow mode messages delivered by the controller for the n−1 flow tables;

create n−1 flow entries in the n−1 flow tables, wherein an $i^{th}$ flow entry is created in the $i^{th}$ flow table, a match field of the $i^{th}$ flow entry is the $i^{th}$ metadata value, an instruction set of the $i^{th}$ flow entry is the $i^{th}$ jump instruction and the $i^{th}$ match instruction, the match field of the $i^{th}$ flow entry is used to match an $(i-1)^{th}$ mapping value Mpi−1, and execute the $i^{th}$ jump instruction and the $i^{th}$ match instruction according to a matching result, the first mapping value Mp1 is the $1^{st}$ mapping value Mp1, the $i^{th}$ match instruction is used to map the $i^{th}$ match field onto the $i^{th}$ mapping value Mpi according to the parameter that is comprised in the $i^{th}$ match instruction and that is used to map the $i^{th}$ match field onto the $i^{th}$ mapping value, and write the $i^{th}$ mapping value Mpi into the metadata field of the $i^{th}$ flow table, and the $i^{th}$ jump instruction is used to jump to the next flow table of the $i^{th}$ flow table, and transfer, to the next flow table of the $i^{th}$ flow table, the packet and the $i^{th}$ mapping value Mpi written in the metadata field of the $i^{th}$ flow table;

receive the last flow mode message delivered by the controller for the last flow table; and create a last flow entry in the last flow table, wherein an instruction set of the last flow entry is the action instruction, a match field of the last flow entry is the $n^{th}$ metadata value, the match field of the last flow entry is used to match an $n^{th}$ mapping value Mpn, and the action instruction is used to process the packet according to a matching result.

12. The switching system according to claim 11, wherein the parameter that is comprised in the first match instruction and that is used to map the first match field onto the first mapping value comprises: a first mask, a first start position of the first match field in a packet to which the first match field belongs, a first quantity of offset bytes of the first match field in the packet to which the first match field belongs, and a first flow identifier of a data flow that comprises the packet to which the first match field belongs, and the mapping the first match field onto a first mapping value Mp1 according to the parameter that is comprised in the first match instruction and that is used to map the first match field onto the first mapping value comprises:

locating the first match field in the received packet according to the first start position and the first quantity of offset bytes, and extracting the first match field;

performing a logical AND operation on the extracted first match field and the first mask; and filling an initial byte of a first continuous byte array with the first flow identifier, copying an operation result of the logical AND operation to remaining bytes of the first continuous byte array successively, and using content of the first continuous byte array for which the filling and copying are completed, as the first mapping value Mp1, wherein the first continuous byte array is data of N bytes, and N is a maximum quantity of bytes that can be comprised in the metadata field of the flow table; and the parameter that is comprised in the $i^{th}$ match instruction and that is used to map the $i^{th}$ match field onto the $i^{th}$ mapping value comprises: an $i^{th}$ mask, an $i^{th}$ start position of the $i^{th}$ match field in a packet to which the $i^{th}$ match field belongs, an $i^{th}$ quantity of offset bytes of the $i^{th}$ match field in the packet to which the $i^{th}$ match field belongs, and an $i^{th}$ flow identifier of a data flow that comprises the packet to which the $i^{th}$ match field belongs, and the mapping the $i^{th}$ match field onto an $i^{th}$ mapping value Mpi according to the parameter that is comprised in the $i^{th}$ match instruction and that is used to map the $i^{th}$ match field onto the $i^{th}$ mapping value comprises:

locating the $i^{th}$ match field in the received packet according to the $i^{th}$ start position and the $i^{th}$ quantity of offset bytes, and extracting the $i^{th}$ match field;

performing a logical AND operation on the extracted $i^{th}$ match field and the $i^{th}$ mask; and filling an initial byte of an $i^{th}$ continuous byte array with the $i^{th}$ flow identifier, copying an operation result of the logical AND operation to remaining bytes of the $i^{th}$ continuous byte array successively, and using content of the $i^{th}$ continuous byte array for which the filling and copying are completed, as the $i^{th}$ mapping value Mpi, wherein the $i^{th}$ continuous byte array is data of N bytes.

* * * * *